United States Patent [19]

Wilcox

[11] 4,005,419
[45] Jan. 25, 1977

[54] BEACON SIDE LOBE DETECTOR

[75] Inventor: Clinton L. Wilcox, Sun Spot, N. Mex.

[73] Assignee: The United States of America as represented by the Secretary of the Army, Washington, D.C.

[22] Filed: Jan. 19, 1976

[21] Appl. No.: 649,952

[52] U.S. Cl. .................................. 343/7.4
[51] Int. Cl. ............................... G01s 7/02
[58] Field of Search ............................. 343/7.4

[56] References Cited
UNITED STATES PATENTS 3,772,695  11/1973  Hoffman .................. 343/7.4 X
3,943,512  3/1976   Dempsey ................... 343/7.4

Primary Examiner—T.H. Tubbesing
Attorney, Agent, or Firm—Nathan Edelberg; Robert P. Gibson; Saul Elbaum

[57] ABSTRACT

A circuit is provided for generating error signals from a tracking radar angle system. The error signals represent normal tracking error and error due to side lobe tracking. An amplifier is connected to the generating circuit for producing a first tone, indicative of normal error and a different second tone due to side lobe tracking error.

5 Claims, 1 Drawing Figure

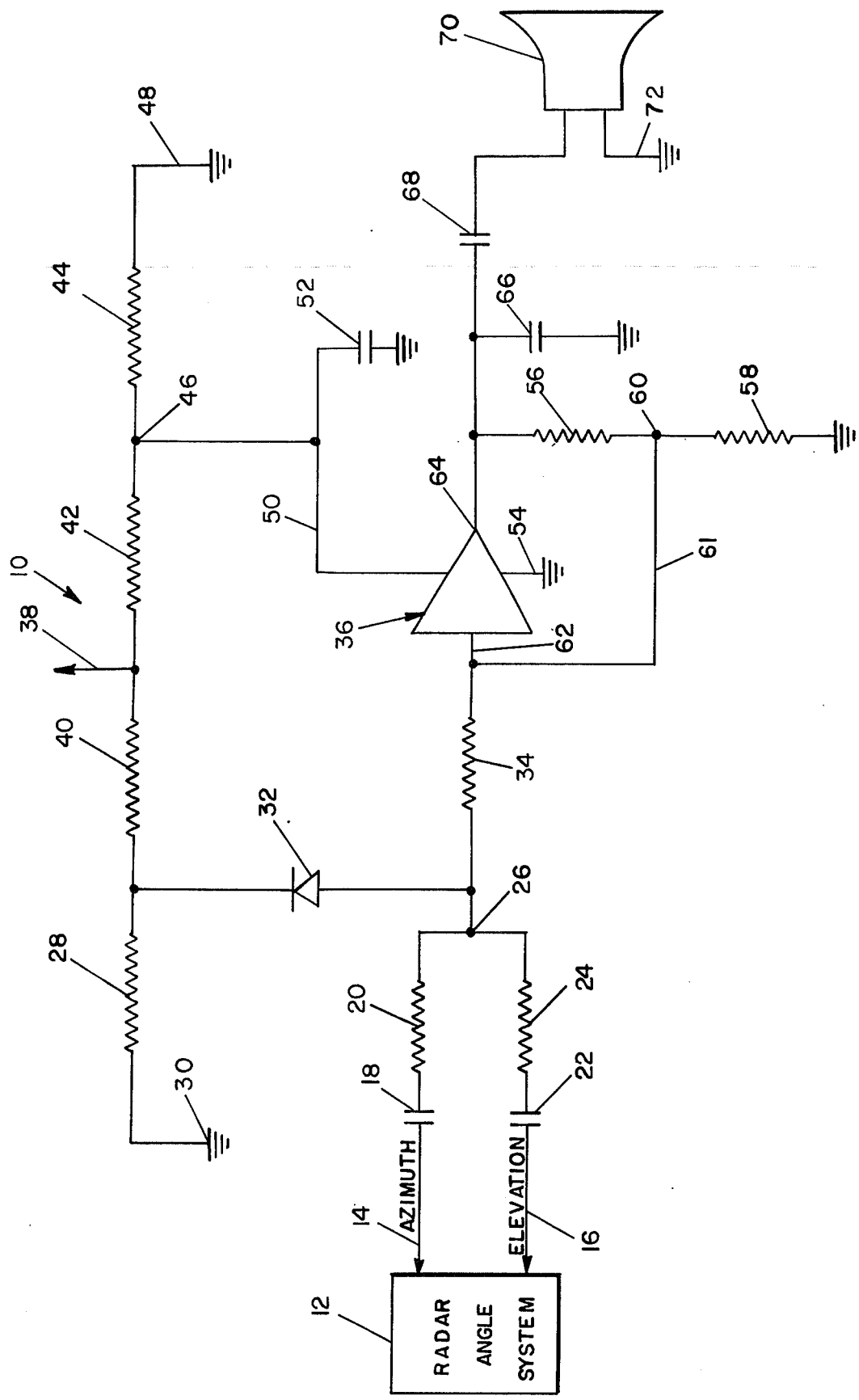

BEACON SIDE LOBE DETECTOR

RIGHTS OF THE GOVERNMENT

The invention described herein may be manufactured, used, and licensed by or for the United States Government for governmental purposes without the payment to me of any royalty thereon.

FIELD OF THE INVENTION

The present invention relates to radar tracking systems, and more particularly to an error detector for such a system.

BRIEF DESCRIPTION OF THE PRESENT INVENTION

On any beacon tracking radar, a major concern is the possibility of tracking a beacon side lobe. A beacon is a device that is installed in a target being tracked. Upon receipt of a coded pulse from a radar, a beacon will transmit a pulse at a different frequency. The radar receives the pulse through an extremely directional antenna. The position of the radar antenna is used to derive the azimuth and elevation angle to the target. The radar position lags the target by a small amount which is normal error.

On a side lobe, the radar tracks a frequency generated in the beacon which is harmonic of the radar's intermediate frequency. Due to the phase relationships between the radar's receiver and the beacon, this erroneous frequency produces an invalid track.

To the operator the beacon return appears to be normal. The only way to tell for sure whether or not the radar is actually tracking the correct beacon return is to look at the radar's reflected code pulse. The only time the operator will see the reflected radar pulse is when the correct beacon pulse is being tracked.

Checking the radar reflected pulse is simple and foolproof. The difficult problem is knowing when to check the pulse. Obviously, the operator could continually monitor the reflected return and that way know the instant the radar moved onto a side lobe. However, if such a procedure were followed, many of the advantages of having a beacon to track would be lost.

The procedure used today is for the operator to check his reflected return anytime he has reason to think he is tracking a side lobe. A good operator will check every once in a while, whether he thinks he is on a side lobe or not. This procedure is not foolproof and even an experienced operator can be fooled and track a side lobe.

BRIEF DESCRIPTION OF THE PRESENT INVENTION

The present invention will sense the occurrence of a radar tracking a side lobe and will generate an audible alarm. Also, a second type of audible alarm will be sounded when the track of the radar becomes rough and needs to be smoothed out.

Upon studying a tracking radar system as it was tracing a side lobe of a beacon, it was found that the radar will side lobe in azimuth or elevation but usually not in both at the same time. It was also found that the errors generated by the angle tracking system appeared to be normal in the angle in which the side lobe occurred. However, it was noticed that when one angle was on a side lobe, the other angle was pulled off center by a small amount. This small amount produced a small error voltage.

The present invention includes an audio amplifier suitably biased to accept this small error and produce a tone which is audible. Upon hearing this tone the operator is warned he is on a side lobe. Of course, the amplifier is constantly on so a tone will be produced by a normal tracking error.

The tone produced by a normal error and the tone produced by the errors from a side lobe are considerably different. The tone produced by a normal error is a good yardstick of the quality of the radar track and a considerable aid in attempts to smooth out the track.

BRIEF DESCRIPTION OF THE FIGURE

The above-mentioned objects and advantages of the present invention will be more clearly understood when considered in conjunction with the accompanying drawing, in which:

The FIGURE is an electrical schematic diagram of the side lobe detector.

DETAILED DESCRIPTION OF THE INVENTION

Referring to the FIGURE, the electrical circuitry for the present invention is generally indicated by reference numeral 10. As seen, the circuitry is connected, at the input thereof, to a radar angle system 12, of conventional design, which does not, per se, form a part of the present invention. A first input lead 14 is connected in series with a capacitor 18 and resistor 20 which furnish the circuit with sufficient isolation from the angle system. Similarly, a second input lead 16 from the radar angle system 12 is connected with capacitor 22 and resistor 24, identical with respective components 18 and 20 for isolation. The right terminals of the resistors 20 and 24 are connected in parallel to a junction point 26. A diode 32 has its anode connected to junction 26 and the cathode connected to a first terminal of a resistor 28, which is grounded at its opposite terminal 30. The diode 32 and resistor 28 limit the incoming signal to a preselected voltage level. The diode 32 is biased by connecting the cathode to a source of potential 38, via resistor 40. The input signal is transmitted from junction 26 to an audio amplifier IC chip 36, via an input resistor 34. For example, the chip may be of the type manufactured by RCA and known as a PA 234, which is a 1 watt audio amplifier chip. DC biasing of the audio amplifier chip 36 is provided by bias resistor 42 which is connected between the potential point 38 and an input terminal 50 to the audio amplifier 36. The previously mentioned resistor 42 is connected with a second resistor 44 as a voltage divider which is grounded, at the right terminal of resistor 44, as indicated by reference numeral 48. The junction point 46 between resistors 42 and 44 provide a bias tap-off point to the lead 50 of the amplifier 36. An AC return from the junction point 46 is provided by the grounded capacitor 52. A ground connection 54 is provided for the amplifier chip 36.

A feedback circuit includes resistors 56 and 58, connected in series with a junction point 60 defined therebetween. These resistors comprise a voltage divider. The upper terminal of the voltage divider is connected to the output 64 of the audio amplifier 36, while the lower end of the voltage divider is grounded. A lead 61 connects the junction point 60 with the input terminal 62 of the audio amplifier chip 36. An AC return, in the form of grounded capacitor 66, is connected to the output 64 of the audio amplifier 36.

A DC blocking capacitor 68 is connected between the output terminal 64 of the audio amplifier 36 and a first input to a conventional speaker 70, which is grounded at a second terminal, as indicated by reference numeral 72.

The amplifier 36 and its connected circuitry offer a high input impedance to avoid loading the error system. Biasing should occur in a manner whereby a relatively low error, for example 0.5 mill error, will produce a maximum signal to the speaker 70 and any errors that are larger look to be only 0.5 mill. This should be done in order to allow the amplifier to be sensitive enough to detect 0.5 mill errors and produce a loud and clear tone, without having an uncomfortably loud tone for the larger errors.

By virtue of the circuitry disclosed herein, a normal error produced during operation of the side lobe detector will generate a tone from speaker 70. However, if the radar angle system 12 tracks a side lobe, the detector circuitry will generate a different tone. Thus, an operator familiar with the equipment can differentiate between a normal error and an error caused by side lobe tracking. In fact, an operator familiar with the detector will be able to utilize the tone produced by a normal error as a yardstick of the quality of the radar track. If the radar track is rough and must be adjusted for smooth operation, the tone during normal error becomes a valuable aid in detecting rough operation thus signalling the requirement for adjustments.

It should be understood that the invention is not limited to the exact details of construction shown and described herein for obvious modifications will occur to persons skilled in the art.

I claim the following:

1. An error detection system for tracking radar comprising:
    a radar angle system having outputs for azimuth and elevation error signals;
    an audio amplifier;
    isolation means connected between the angle system outputs and an input of the audio amplifier; and
    a speaker connected to an output of the audio amplifier for producing different audible tones in response to different azimuth and elevation error signals.

2. The subject matter set forth in claim 1 together with circuit means connected between an output of the isolation means and the amplifier input for limiting the error signals, fed to the amplifier, to a preselected maximum voltage, thus limiting the volume of the audible tones.

3. The subject matter set forth in claim 2 wherein the isolation means includes at least one path including series connected resistor and capacitor components.

4. The subject matter set forth in claim 2 wherein the isolation means includes two parallel paths, each path including series connected resistor and capacitor components.

5. The subject matter of claim 4 wherein the limiting means includes a diode, connected at a first end, to the junction point between the resistor and the input of the amplifier, a second end of the diode connected to a bias potential.

* * * * *